Oct. 23, 1945.　　　　N. HOROWITZ　　　　2,387,328
ANIMAL TRAP
Filed June 7, 1944　　　3 Sheets-Sheet 1
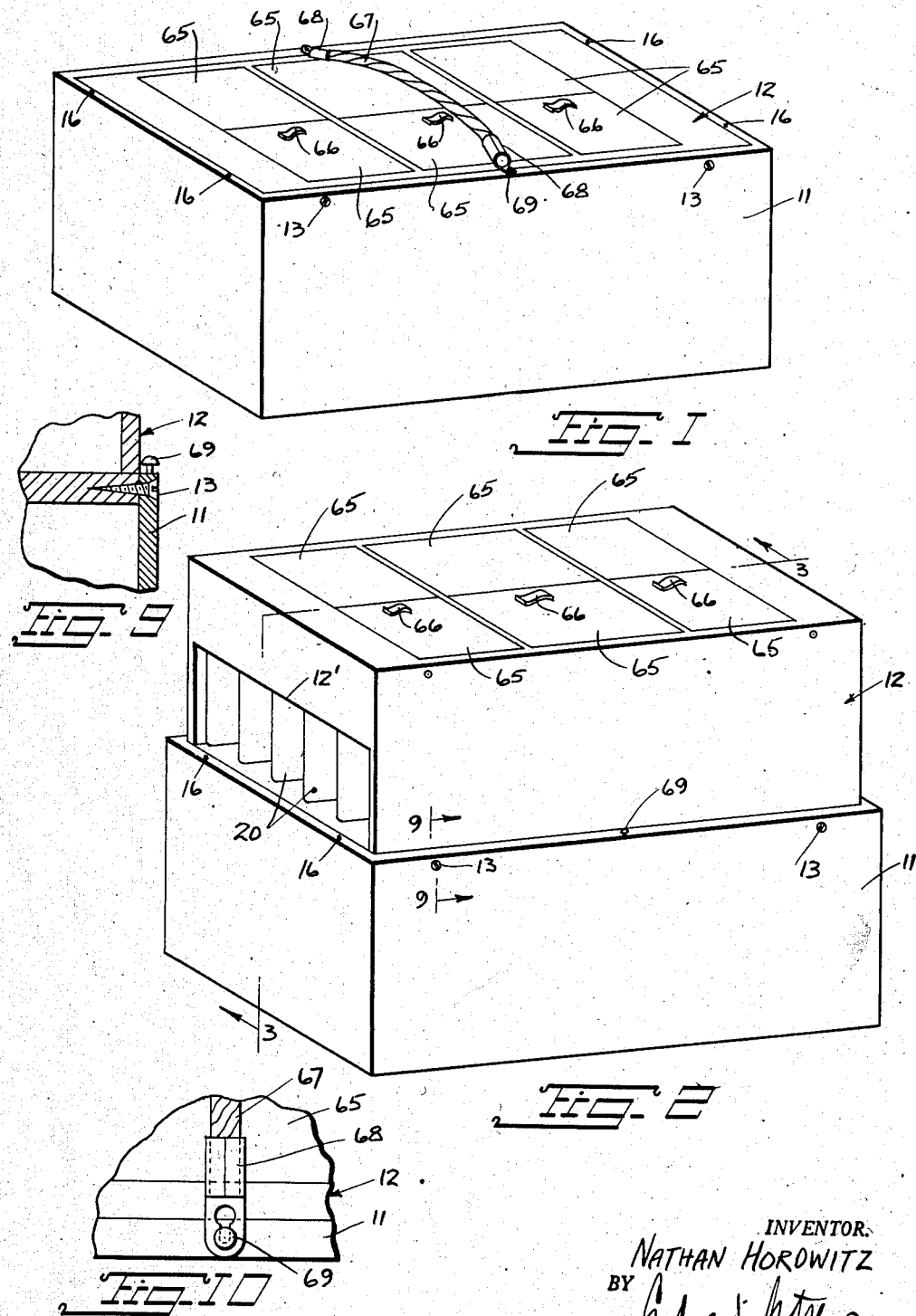
INVENTOR.
NATHAN HOROWITZ
BY
ATTORNEY.

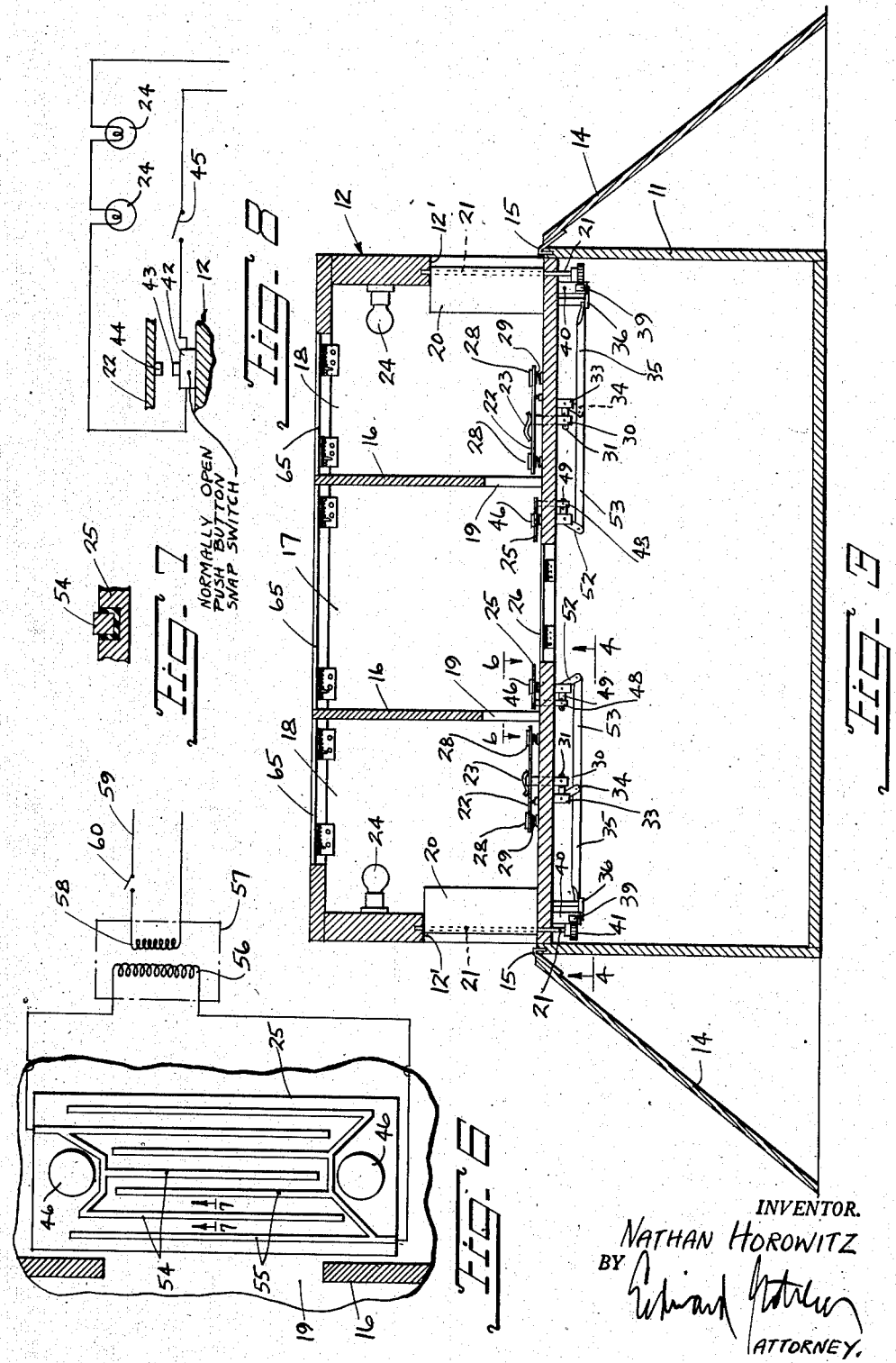

Oct. 23, 1945.   N. HOROWITZ   2,387,328
ANIMAL TRAP
Filed June 7, 1944   3 Sheets-Sheet 3

INVENTOR.
NATHAN HOROWITZ
BY
ATTORNEY.

Patented Oct. 23, 1945

2,387,328

UNITED STATES PATENT OFFICE 2,387,328

ANIMAL TRAP

Nathan Horowitz, Brooklyn, N. Y., assignor of twenty-five per cent to Henry L. Horowitz, Bronx, N. Y.; twenty-five per cent to Philip Fleischer, New York, N. Y.; and twenty-five per cent to Alfred Smolovit, Brooklyn, N. Y.

Application June 7, 1944, Serial No. 539,138

9 Claims. (Cl. 43—99)

This invention relates to new and useful improvements in animal traps, and has more particular reference to a rat trap.

The invention proposes a relatively large rat trap which may entrap a large number of rats at one time, for example, two dozen or more. An important feature of the rat trap resides in the fact that it may be folded up to be of a relatively small compass so that it may be conveniently carried around to be rented out as a rat catching service, or stored away when not in use.

Another and dominating feature of the rat trap resides in a performance of a certain sequence of events when a rat enters the trap, calculated to drive the rat into a bottom holding receptacle of the trap. If desired, this receptacle may be filled with water so that the rats drown when they tire of swimming around. Or the receptacle may filled with other substances calculated to kill and destroy the animals.

In so far as the folding feature of the new and improved animal trap is concerned, it is proposed to characterize the new trap by a bottom receptacle for resting on the ground or other support, and to provide a top housing releasably mounted in the top of said bottom receptacle, so it may be engaged into said bottom receptacle for folding or collapsing the trap.

The invention also proposes the provision of planks for assisting the animals to climb up and reach and enter the top housing of the trap.

The top housing of the trap contains the mechanism calculated to drive an animal into the bottom receptacle. More specifically, it is proposed to divide the top housing into a dark chamber connected by an opening or openings with an adjacent chamber or adjacent light chambers. It is proposed that the top housing have an opening or openings in its side walls through which the animals may enter the light chamber or chambers.

The invention proposes a door or a plurality of doors for closing the openings in the side wall or walls of the top housing. It is proposed that a bait platform be arranged within each light chamber, and that each light chamber be provided with a blinding flood light or lights located over the door or doors of the chamber for driving an animal which enters said light chamber to said dark chamber when the floodlights are illuminated.

It is proposed to provide said dark chamber with an animal shocking platform or platforms adjacent the opening, or openings into the light chamber or chambers so that when an animal rushes into the dark chamber it will receive a shock and leap.

It is proposed to provide means for automatically closing the door or doors of each light chamber when an animal mounts a bait platform located in the light chamber. Means is provided for illuminating said flood light or lights when and while an animal is on said bait platform. An arrangement is provided for opening the door or doors of the light chamber when an animal mounts the shocking platform. The dark chamber is provided with an automatic trap door to the bottom receptacle. Automatic means is proposed for shocking an animal on said shocking platform to induce it to leap on to said trap door and so fall into the bottom receptacle.

The invention also proposes providing the top of the housing of the trap with bait trap doors for animals to fall through into said various chambers from which they may be driven into the bottom receptacle as previously explained.

Another object of the invention is the construction of a device as mentioned which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of an animal trap constructed in accordance with this invention, and shown in a collapsed condition.

Fig. 2 is a perspective view of the animal trap in its extended position, except for the planks which are supplied to enable animals to reach the top housing of the trap.

Fig. 3 is an enlarged longitudinal sectional view taken on the line 3—3 of Fig. 2, to which the planks have been added.

Fig. 6 is a fragmentary enlarged sectional view taken on the line 6—6 of Fig. 3 to which schematic wiring has been added.

Fig. 7 is a fragmentary enlarged sectional view taken on the line 7—7 of Fig. 6.

Fig. 8 is a schematic wiring diagram of the floodlight circuit of the trap.

Fig. 9 is a fragmentary enlarged vertical sectional view taken on the line 9—9 of Fig. 2.

Fig. 10 is a fragmentary enlarged plan view of a portion of Fig. 1.

Figure 4:
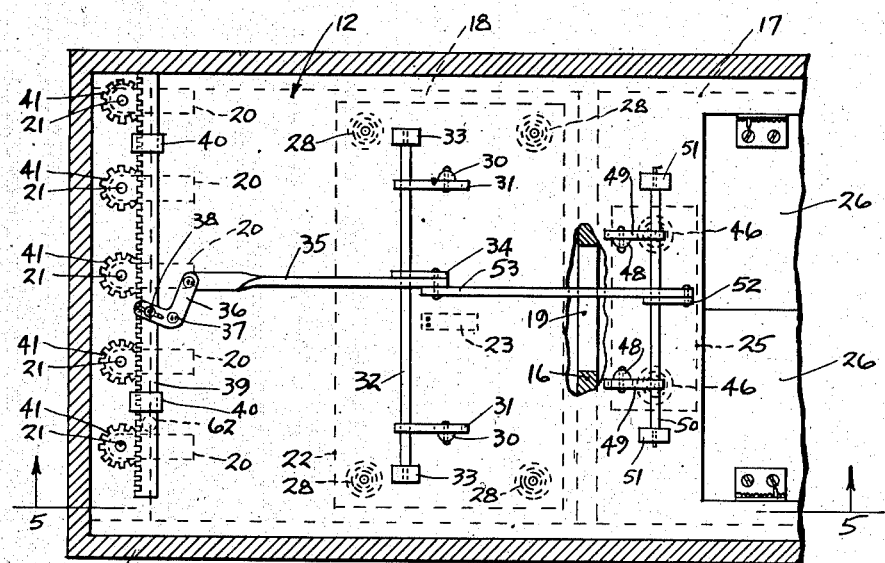
Fig. 4 is a fragmentary enlarged bottom sectional view taken on the line 4—4 of Fig. 3.
Figure 5:
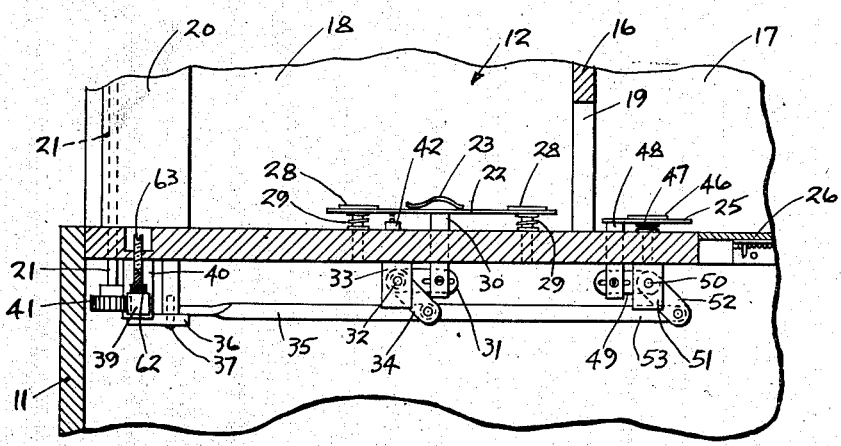
Fig. 5 is a fragmentary sectional view taken on the line 5—5 of Fig. 4.

The animal trap, in accordance with this invention, includes a bottom receptacle 11 for resting on the floor or other support. This receptacle is in the nature of a box having an open top. A top housing 12 is adapted to engage into the receptacle 11 when the trap is collapsed. The top housing 12 is in the nature of a box closed on all sides, and on the top and bottom. It is supported in the top of the receptacle by several screws 13 engaged through the top portions of the side walls of the bottom receptacle 11 and engaging the side edges of the bottom wall of the top housing 12. When the screws 13 are unscrewed the top housing 12 may be let down into the bottom receptacle 11.

The top housing 12 is formed with one or more openings 12' in the side or end walls thereof through which animals may enter. Planks 14 are provided for the animals to climb up for easily reaching the housing 12. Said planks 14 extend from said openings 12' to the floor or other support. These planks 14 are merely in the nature of boards which are provided with top hooks 15 engageable into complementary openings 16 formed in the top edges of the side walls of the bottom receptacle 11. The planks 14 when removed may be stored in the bottom receptacle 11.

The top housing 12 is divided by several partitions 16 into a central dark chamber 17 connected by openings 19 through the partitions 16 with adjacent light chambers 18. The openings 12' connect with the light chambers 18. We call these "light chambers" merely because they are adjacent the openings 12' and receive light from the exterior. We call the chamber 17 "dark" because it is located centrally within the housing 12. Moreover, the chamber 17 is not illuminated while the light chambers 18 are illuminated with floodlights 24 at certain times, as will become clear as this specification proceeds.

Each opening 12' is provided with a closure for closing the same. In the particular design of animal trap shown each closure consists of a plurality of vertical panels 20. These panels are mounted on spindles 21 which are journaled at their top and bottom end portions on the housing 12 and which extend through the bottom wall of the housing 12. When the panels 20 extend inwards, as illustrated on the drawings, the closure is considered open as rats or other animals may pass in between the panels 20. When the spindles 21 are turned through 90°, the panels 20 will turn similarly and then be in edge alignment with each other across the opening 12', closing same.

A bait platform 22 is located within each light chamber 18. Each bait platform 22 is provided with a bait clip 23 for holding bait such as cheese, oysters, etc. Blinding floodlights 24, such as are used as flood lamps in photographic work, are mounted over each opening 12' for driving an animal away from the opening 12' and towards the dark chamber 17. Animal shocking platforms 25 are located within the dark chamber 17 adjacent each opening 19 from the light chambers 18. The dark chamber 17 is provided with trap doors 26 which are normally spring closed and which open downwards when an animal jumps or falls on it. These trap doors 26 are spring urged to close, as an animal drops through, the details not being shown because trap doors of this type are generally known.

The bait platforms 22 are associated with means for closing the doors of the light chambers 18 in which they are located. More specifically, each bait platform 22 is supported on several headed studs 28 mounted upon the bottom wall of the housing 12. Small springs 29 are coaxially mounted on the studs 28 and normally urge the bait platform 22 upwards against the heads of the studs. A small rod 30 connects with each platform 22 and engages through openings in the bottom wall of the housing 12. This rod 30 connects with arms 31 which in turn are fixedly mounted on a spindle 32 turnably mounted in bearings 33 mounted upon the bottom face of the bottom wall of the housing 12. The spindle 32 is provided with another rigid arm 34 which pivotally connects with a link 35, in turn pivotally connected with one arm of a bell crank 36.

Each bell crank 36 is pivotally supported intermediate of its ends by a pintle 37 mounted on the bottom face of the bottom wall of the housing 12. The other arm of each bell crank 36 pivotally connects with a stud 38 mounted on a rack 39. Each rack 39 is slidably mounted in bearings 40 secured on the bottom wall of the housing 12. The racks 39 mesh with small pinions 41 mounted upon the spindles 21. The parts are so proportioned that when a rat or other animal gets onto a bait platform 22, the platform 22 will be moved downwards, and this motion will be transmitted by the rods 30, the arms 31 and 34, the link 35, the bell crank 36, and the rack 39 to move the pinions 41 through 90° and so move the panels 20 for closing the opening 12'.

Means is provided for illuminating said floodlights 24 of each light chamber 18 when an animal gets on the bait platform 22 of that particular chamber. This means includes for each chamber 18 a normally open push button snap switch 42 located beneath the platform 22 and having a push button 43 engageable by a button 44 mounted upon the bottom of the platform 22 when the platform 22 is depressed. The push button switch 42 is connected in an electric circuit which controls the flood lamps 24. This circuit has a main switch 45 which must be closed when the trap is set.

Each shocking platform 25 is associated with means for opening the panels 20 when an animal mounts the shocking platform. This means includes several headed studs 46 which vertically slidably support the platform 25. Springs 47 are mounted on these studs 46 and normally urge the platform 25 upwards against the heads of the studs 46. Each platform 25 is provided with several rods 48 extending through the bottom wall of the housing 12. These rods 48 connect with arms 49. The arms 49 are fixedly mounted upon a spindle 50 turnably supported in bearings 51 mounted upon the bottom of the housing 12. The spindle 50 is provided with another fixed arm 52 which pivotally connects with a link 53 in turn pivotally connected with the link 35.

The means for shocking an animal on the shocking platform 25 to induce it to leap onto the trap doors 26 and fall into the bottom receptacle 11 includes a group of exposed conductor wires 54 intermingled with another group of exposed conductor wires 55. These conductor wires are mounted on and insulated from the platform 25. The conductor wires 54 and 55 are respectively connected in a circuit with the ends of the secondary coil 56 of a transformer 57. The primary coil 58 of this transformer connects with an alternating current circuit 59 which is provided with a control switch 60.

Each rack 39 is associated with friction means to control its freedom of sliding. Each friction means includes a rubber or other friction member 62 mounted on the bottom of a stud 63 threadedly mounted through the bottom wall of the housing 12. The top wall of the housing 12 is also provided with a plurality of trap doors 65 which connect with the chambers 17 and 18. These trap doors 65 are provided with bait clips 66 for holding bait. The trap doors 65 are spring urged into closed positions and open up when an animal walks on them, so as to drop the animal through and into the chambers 17 or 18.

The bottom receptacle 11 is provided with a handle consisting of a rope 67 having end grips 68 which may be releasably hooked onto headed studs 69 mounted on the top edges of the receptacle 11.

The operation of the animal trap is as follows:

It is set up as illustrated in Fig. 3. It is baited with attractive bait. The rats will walk up the planks 14 and either enter the openings 12' or climb on top of the housing 12 to get at the bait on top of the trap. When they enter the opening 12' nothing happens until they get on to a bait platform 22. This platform 22 is immediately depressed and before they have an opportunity to even reach the bait, the panels 20 close because of the downward motion of the platform 22 which is transmitted indirectly to the small pinions 41. Simultaneously, a normally open push button snap switch 42 closes so that the flood lights 24 go on. They blind the rat, which immediately seeks shelter by attempting to run through the hole 19 into the dark compartment 17. When trying to do this the rat mounts the shocking platform 25 and short circuits the conductors 54 and 55, receiving an electric shock. This shock does not kill the rat but causes it to leap on to the trap door 26 which opens up, discharging the rat into the bottom receptacle 11. This receptacle must be filled with water so that the rat will swim around until it tires, and drowns.

Rats climbing to the top of the trap to reach the bait in the clip 66 will fall through the trap doors 65. These trap doors must be constructed of smooth metal so that they cannot grip and hold the trap doors when they feel them opening. If the rat falls into the dark compartment 17, it will continue falling through trap door 26. If it falls into one of the light compartments 18 it will fall upon a bait platform 22 which is located beneath a top trap door 65. The weight of the rat will depress the bait platform 22, closing the panels 20 and closing the switch 42, and causing the floodlights 24 to become illuminated. The frightened animal will immediately seek shelter through an opening 19 to reach the dark chamber 17. Upon running on to the shocking platform 25 the rat will be shocked and will leap up and fall down on the trap door 26 and discharge into the bottom receptacle 11.

When a rat depresses a bait platform 22 the panels 20 associated with that bait platform 22 will be closed as before stated. The friction device 62 will aid in holding panels 20 closed even though the rat gets off the bait platform 22. For this reason the rat cannot escape from the chamber 18, except by going through the opening 19. When the rat goes through the opening 19 and gets on to the shocking platform 25, it depresses the platform 25 which, when moving down, moves the rods 49 and which turn the spindle 50. This moves the arm 52 the link 53 and the link 35. This opens the panels 20 because now the link 35 is being moved backwards. It should be noted that the platforms 22 and 25 are always in opposite phase. When one is up the other is down, and vice versa. Thus when a rat depresses the bait platform 22, the shocking platform 25 moves up and is ready to receive the rat.

Fig. 3 shows the trap ready to be used. When it is desired to store the trap, or to carry it to another location, the planks 14 are removed, the screws 13 are removed, and the top housing 12 lifted out from the top of the bottom receptacle 11. The planks 14 are then placed in the receptacle 11. The housing 12 is placed into the receptacle 11, the handle 67 is mounted in position as shown in Fig. 1, and the trap is ready to be carried by the handle 67.

While I have illustrated and described the preferred embodiments of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:

1. An animal trap, comprising a bottom receptacle for resting on the floor or other support, a top housing mounted in the top of said receptacle and divided into a dark chamber connected by an opening with an adjacent light chamber and having another opening in its side wall through which animals may enter the light chamber, a closure for closing said latter mentioned opening, a bait platform within said light chamber, a blinding floodlight over said door for driving an animal in said light chamber to said dark chamber when illuminated, an animal shocking platform in said dark chamber adjacent the opening to the light chamber, means for closing said closure when an animal gets upon said bait platform, means for illuminating said flood light when and while an animal is on said bait platform, means for opening said closure when an animal mounts said shocking platform, a trap door in said dark chamber to said bottom receptacle, means for shocking an animal on said shocking platform to induce it to leap on to said trap door and fall into said bottom receptacle.

2. An animal trap, comprising a bottom receptacle for resting on the floor or other support, a top housing mounted in the top of said receptacle and divided into a dark chamber connected by an opening with an adjacent light chamber and having another opening in its side wall through which animals may enter the light chamber, a closure for closing said latter mentioned opening, a bait platform within said light chamber, a blinding floodlight over said door for driving an animal in said light chamber to said dark chamber when illuminated, an animal shocking platform in said dark chamber adjacent the opening to the light chamber, means for closing said closure when an animal gets upon said bait platform, means for illuminating said flood light when and while an animal is on said bait platform, means for opening said closure when an animal mounts said shocking platform, a trap door in said dark chamber of said bottom receptacle, means for shocking an animal on said shocking platform to induce it to leap on to said trap door and fall into said bottom receptacle, said closure comprising a plurality of pivotally mounted panels.

3. An animal trap, comprising a bottom receptacle for resting on the floor or other support, a top housing mounted in the top of said receptacle and divided into a dark chamber connected by an opening with an adjacent light chamber and having another opening in its side wall through which animals may enter the light chamber, a closure for closing said latter mentioned opening, a bait platform within said light chamber, a blinding floodlight over said door for driving an animal in said light chamber to said dark chamber when illuminated, an animal shocking platform in said dark chamber adjacent the opening to the light chamber, means for closing said closure when an animal gets upon said bait platform, means for illuminating said flood light when and while an animal is on said bait platform, means for opening said closure when an animal mounts said shocking platform, a trap door in said dark chamber of said bottom receptacle, means for shocking an animal on said shocking platform to induce it to leap on to said trap door and fall into said bottom receptacle, said means for closing said closure including studs for vertically slidably supporting said bait platform, panels forming said closure and mounted on spindles, and means for turning said spindles to close said panels when said bait platform is depressed.

4. An animal trap, comprising a bottom receptacle for resting on the floor or other support, a top housing mounted in the top of said receptacle and divided into a dark chamber connected by an opening with an adjacent light chamber and having another opening in its side walls through which animals may enter the light chamber, a closure for closing said latter mentioned opening, a bait platform within said light chamber, a blinding flood light over said door for driving an animal in said light chamber to said dark chamber when illuminated, an animal shocking platform in said dark chamber adjacent the opening to the light chamber, means for closing said closure when an animal gets upon said bait platform, means for illuminating said flood light when and while an animal is on said bait platform, means for opening said closure when an animal mounts said shocking platform, a trap door in said dark chamber to said bottom receptacle, means for shocking an animal on said shocking platform to induce it to leap on to said trap door and fall into said bottom receptacle, said means for closing said closure including studs for vertically slidably supporting said bait platform, panels forming said closure and mounted on spindles, and means for turning said spindles to close said panels when said bait platform is depressed, including a rack slidably mounted and engaging pinions mounted on said spindles.

5. An animal trap, comprising a bottom receptacle for resting on the floor or other support, a top housing mounted in the top of said receptacle and divided into a dark chamber connected by an opening with an adjacent light chamber and having another opening in its side walls through which animals may enter the light chamber, a closure for closing said latter mentioned opening, a bait platform within said light chamber, and a blinding flood light over said door for driving an animal in said light chamber to said dark chamber when illuminated, an animal shocking platform in said dark chamber adjacent the openings to the light chamber, means for closing said closure when an animal gets on said bait platform, means for illuminating said flood light when and while an animal is on said bait platform, means for opening said closure when an animal mounts said shocking platform, a trap door in said dark chamber to said bottom receptacle, means for shocking an animal on said shocking platform to induce it to leap on to said trap door and fall into said bottom receptacle, said means for closing said closure including studs for vertically slidably supporting said bait platform, panels forming said closure and mounted on spindles, and means for turning said spindles to close said panels when said bait platform is depressed, including a rack slidably mounted and engaging pinions mounted on said spindles, a friction element engaging said rack for controlling its freedom of sliding, and a linkage system connecting said shocking platform with said bait platform so that when one is up the other is down and vice versa.

6. An animal trap, comprising a bottom receptacle for resting on the floor or other support, a top housing mounted in the top of said receptacle and divided into a dark chamber connected by an opening with an adjacent light chamber and having another opening in its side wall through which animals may enter the light chamber, a closure closing said latter mentioned opening, a bait platform within said light chamber, a blinding flood light over said door for driving an animal in said light chamber to said dark chamber when illuminated, an animal shocking platform in said dark chamber adjacent the opening to the light chamber, means for closing said closure when an animal gets upon said bait patform, means for illuminating said flood light when and while an animal is on said bait platform, means for opening said closure when an animal mounts said shocking platform, a trap door in said dark chamber to said bottom receptacle, means for shocking an animal on said shocking platform to induce it to leap on to said trap door and fall into said bottom receptacle, said means for illuminating said flood lights including a switch beneath said bait platform to be closed when the bait platform moves down, and an electric circuit including said flood lights and controlled by said switch.

7. An animal trap, comprising a bottom receptacle for resting on the floor or other support, a top housing mounted in the top of said receptacle and divided into a dark chamber connected by an opening with an adjacent light chamber and having another opening in its side wall through which animals may enter the light chamber, a closure for closing said latter mentioned opening, a bait platform within said light chamber, a blinding flood light over said door for driving an animal in said light chamber to said dark chamber when illuminated, an animal shocking platform in said dark chamber adjacent the opening to the light chamber, means for closing said closure when an animal gets upon said bait platform, means for illuminating said flood light when and while an animal is on said bait platform, means for opening said closure when an animal mounts said shocking platform, a trap door in said dark chamber to said bottom receptacle, means for shocking an animal on said shocking platform to induce it to leap on to said trap door and fall onto said bottom receptacle, including intermingled spaced conductor wires on said shocking platform adapted to be short circuited by an animal on the platform, and a shocking electric circuit connected with said conductors.

8. An animal trap, comprising a bottom receptacle for resting on the floor or other support, a top housing mounted in the top of said receptacle and divided into a dark chamber connected by an opening with an adjacent light chamber and having another opening in its side wall through which animals may enter the light chamber, a closure for closing said latter mentioned opening, a bait platform within said light chamber, a blinding flood light over said door for driving an animal in said light chamber to said dark chamber when illuminated, an animal shocking platform in said dark chamber adjacent the opening to the light chamber, means for closing said closure when an animal gets upon said bait platform, means for illuminating said flood light when and while an animal is on said bait platform, means for opening said closure when an animal mounts said shocking platform, a trap door in said dark chamber to said bottom receptacle, means for shocking an animal on said shocking platform to induce it to leap on to said trap door and fall into said bottom receptacle, and bait trap doors on the top of said housing for animals to fall through into said chambers.

9. An animal trap, comprising a bottom receptacle for resting on the floor or other support, a top housing mounted in the top of said receptacle and divided into a dark chamber connected by an opening with an adjacent light chamber and having another opening in its side wall through which animals may enter the light chamber, a closure for closing said latter mentioned opening, a bait platform within said light chamber, a blinding flood light over said door for driving an animal in said light chamber to said dark chamber when illuminated, an animal shocking platform in said dark chamber adjacent the opening to the light chamber, means for closing said closure when an animal gets upon said bait platform, means for illuminating said floodlight when and while an animal is on said bait platform, means for opening said closure when an animal mounts said shocking platform, a trap door in said dark chamber to said bottom receptacle, means for shocking an animal on said shocking platform to induce it to leap on to said trap door and fall into said bottom receptacle, said means for closing said closure being connected with said bait platform, and said means for opening said closure being connected with said shocking platform and arranged so that when one of said platforms is up, the other is down, and vice versa.

NATHAN HOROWITZ.